US010042658B1

(12) United States Patent
Day et al.

(10) Patent No.: US 10,042,658 B1
(45) Date of Patent: *Aug. 7, 2018

(54) AUTOMATICALLY ADDING BYTECODE TO A SOFTWARE APPLICATION TO DETERMINE NETWORK COMMUNICATION INFORMATION

(71) Applicant: Veritas Technologies LLC, Mountain View, CA (US)

(72) Inventors: Brian Day, Villa Park, IL (US); Daryl Hoyt, Aurora, IL (US)

(73) Assignee: Veritas Technologies LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/904,815

(22) Filed: May 29, 2013

Related U.S. Application Data

(63) Continuation of application No. 11/862,359, filed on Sep. 27, 2007, now Pat. No. 8,458,670.

(51) Int. Cl.
*G06F 9/44* (2018.01)
*G06F 9/45* (2006.01)
*G06F 9/455* (2018.01)
*G06F 11/34* (2006.01)
*G06F 11/36* (2006.01)

(52) U.S. Cl.
CPC ...... *G06F 9/45516* (2013.01); *G06F 11/3466* (2013.01); *G06F 9/45504* (2013.01); *G06F 11/3688* (2013.01); *G06F 2201/865* (2013.01)

(58) Field of Classification Search
CPC .......... G06F 11/3466; G06F 2201/865; G06F 11/3636; G06F 11/3688; G06F 9/45516; G06F 9/45504; G06F 8/443
See application file for complete search history.

(56) References Cited

U.S. PATENT DOCUMENTS 6,260,187 B1 * 7/2001 Cirne ........................... 717/118
6,425,014 B1   7/2002 Aiken, Jr. et al.
(Continued)

OTHER PUBLICATIONS

Funika et al., "Dynamic Instrumentation of Distributed Java Applications Using Bytecode Modifications", Springer-Verlag Berlin Heidelberg, ICCS 2006, Part II, LNCS 3992, May 2006, pp. 534-541; <https://link.springer.com/content/pdf/10.1007/11758525_72.pdf>.*

(Continued)

*Primary Examiner* — Thuy Dao
*Assistant Examiner* — Ben C Wang
(74) *Attorney, Agent, or Firm* — Patent Law Works LLP

(57) ABSTRACT

A system and method for automatically analyzing virtual machine bytecode of a software application and adding additional bytecode operable to determine information regarding network communication performed by the software application are described. According to one embodiment of the method, program code of a software application may be received, wherein the program code includes bytecode for a virtual machine. The bytecode may be automatically analyzed to detect network communication functionality. The method may operate to automatically add additional bytecode to the bytecode of the software application, where the added bytecode is operable to determine information regarding the network communication.

18 Claims, 3 Drawing Sheets

(56) References Cited

U.S. PATENT DOCUMENTS

| | | | |
|---|---|---|---|
| 6,637,025 B1 | 10/2003 | Beadle et al. | |
| 7,039,702 B1 | 5/2006 | Churchyard | |
| 7,114,150 B2* | 9/2006 | Dimpsey | G06F 11/3466 717/131 |
| 7,240,335 B2 | 7/2007 | Angel et al. | |
| 7,263,690 B1 | 8/2007 | Shapiro | |
| 7,275,241 B2 | 9/2007 | Choi et al. | |
| 7,281,242 B2 | 10/2007 | Inamdar | |
| 7,293,259 B1* | 11/2007 | Dmitriev | G06F 11/3466 714/E11.207 |
| 7,293,260 B1 | 11/2007 | Dmitriev | |
| 7,367,025 B1 | 4/2008 | Nikolov et al. | |
| 7,401,324 B1 | 7/2008 | Dmitriev | |
| 7,421,682 B2 | 9/2008 | Viehland et al. | |
| 7,426,717 B1 | 9/2008 | Schang et al. | |
| 7,441,154 B2 | 10/2008 | Klotz et al. | |
| 7,461,070 B2 | 12/2008 | Srivastava | |
| 7,464,161 B2 | 12/2008 | Chagoly et al. | |
| 7,475,055 B2 | 1/2009 | Hutchison et al. | |
| 7,475,214 B2 | 1/2009 | Hwang | |
| 7,475,388 B2 | 1/2009 | Fong et al. | |
| 7,484,209 B2* | 1/2009 | Avakian | G06F 11/3476 717/118 |
| 7,496,903 B2 | 2/2009 | Rees et al. | |
| 7,512,935 B1* | 3/2009 | Cobb | 717/158 |
| 7,533,389 B2 | 5/2009 | Verbeke et al. | |
| 7,882,501 B1* | 2/2011 | Carlson et al. | 717/167 |
| 7,926,042 B2* | 4/2011 | Mehta | G06F 11/3676 717/130 |
| 8,051,163 B2* | 11/2011 | Ruiz et al. | 709/224 |
| 8,082,491 B1* | 12/2011 | Abdelaziz | G06F 9/465 709/201 |
| 8,176,480 B1* | 5/2012 | Spertus | G06F 8/443 717/127 |
| 8,307,345 B2 | 11/2012 | Sunkara et al. | |
| 8,341,605 B2 | 12/2012 | Cobb et al. | |
| 8,458,670 B2* | 6/2013 | Day et al. | 717/130 |
| 2003/0135758 A1 | 7/2003 | Turner | |
| 2003/0191989 A1* | 10/2003 | O'Sullivan | 714/47 |
| 2003/0225917 A1* | 12/2003 | Partamian | G06F 9/45504 719/310 |
| 2004/0068560 A1* | 4/2004 | Oulu et al. | 709/224 |
| 2004/0107416 A1* | 6/2004 | Buban et al. | 717/175 |
| 2004/0123279 A1* | 6/2004 | Boykin et al. | 717/158 |
| 2004/0133882 A1 | 7/2004 | Angel et al. | |
| 2004/0163077 A1* | 8/2004 | Dimpsey | G06F 11/3466 717/130 |
| 2005/0039172 A1 | 2/2005 | Rees et al. | |
| 2005/0039187 A1* | 2/2005 | Avakian | G06F 11/3476 719/310 |
| 2005/0114848 A1 | 5/2005 | Choi et al. | |
| 2005/0223365 A1 | 10/2005 | Smith et al. | |
| 2005/0256664 A1* | 11/2005 | Blumfield et al. | 702/121 |
| 2005/0257207 A1* | 11/2005 | Blumfield et al. | 717/168 |
| 2005/0257208 A1 | 11/2005 | Blumfield et al. | |
| 2006/0123067 A1* | 6/2006 | Ghattu et al. | 707/203 |
| 2006/0136516 A1 | 6/2006 | Jain et al. | |
| 2006/0200806 A1* | 9/2006 | Tasinga | 717/128 |
| 2006/0271395 A1* | 11/2006 | Harris | G06F 9/52 718/1 |
| 2007/0011330 A1 | 1/2007 | Dinker et al. | |
| 2007/0043861 A1* | 2/2007 | Baron et al. | 709/224 |
| 2007/0074187 A1* | 3/2007 | O'Brien | 717/140 |
| 2007/0168670 A1 | 7/2007 | Dean et al. | |
| 2007/0168998 A1* | 7/2007 | Mehta | G06F 11/3676 717/130 |
| 2007/0169055 A1* | 7/2007 | Greifeneder | 717/158 |
| 2007/0234311 A1* | 10/2007 | Plummer | G06F 9/443 717/136 |
| 2007/0266045 A1* | 11/2007 | Bansal et al. | 707/104.1 |
| 2007/0266149 A1 | 11/2007 | Cobb et al. | |
| 2008/0034082 A1 | 2/2008 | McKinney | |
| 2008/0052691 A1* | 2/2008 | Neelakantam | G06F 9/45516 717/148 |
| 2008/0052701 A1 | 2/2008 | Abernethy et al. | |
| 2008/0134209 A1* | 6/2008 | Bansal et al. | 719/317 |
| 2008/0148039 A1 | 6/2008 | Cobb et al. | |
| 2008/0148242 A1* | 6/2008 | Cobb et al. | 717/130 |
| 2008/0229300 A1* | 9/2008 | O'Brien | 717/168 |
| 2008/0263548 A1 | 10/2008 | Chagoly et al. | |
| 2008/0276227 A1* | 11/2008 | Greifeneder | 717/130 |
| 2008/0301636 A1 | 12/2008 | Khan | |
| 2008/0301710 A1 | 12/2008 | Shetty | |
| 2008/0306711 A1* | 12/2008 | Bansal | 702/182 |
| 2009/0055821 A1* | 2/2009 | Grcevski | G06F 9/45516 718/1 |
| 2009/0064113 A1* | 3/2009 | Langman | G06F 8/443 717/148 |
| 2009/0083271 A1* | 3/2009 | Day | G06F 8/52 |
| 2009/0089749 A1* | 4/2009 | Day | G06F 9/445 717/118 |
| 2009/0089766 A1* | 4/2009 | Day | G06F 9/45516 717/148 |
| 2009/0119651 A1* | 5/2009 | Slattery | G06F 9/45516 717/145 |
| 2009/0172653 A1* | 7/2009 | Elliott | 717/148 |
| 2010/0005457 A1* | 1/2010 | Komatsu | G06F 8/443 717/145 |
| 2010/0115495 A1 | 5/2010 | Sunkara et al. | |
| 2010/0199259 A1* | 8/2010 | Quinn et al. | 717/106 |
| 2011/0239194 A1* | 9/2011 | Braude | G06F 11/3688 717/124 |
| 2012/0266149 A1* | 10/2012 | Lebert | G06F 9/44563 717/166 |
| 2012/0297371 A1* | 11/2012 | Greifeneder et al. | 717/128 |
| 2012/0304160 A1* | 11/2012 | Soeder | 717/148 |
| 2013/0152054 A1* | 6/2013 | Bates | G06F 11/3628 717/129 |
| 2013/0152064 A1* | 6/2013 | Gagliardi | G06F 9/44521 717/166 |
| 2014/0047416 A1* | 2/2014 | Pizlo | G06F 8/443 717/128 |
| 2014/0101643 A1* | 4/2014 | Inoue | G06F 8/4441 717/156 |
| 2014/0173571 A1* | 6/2014 | Gluck | G06F 11/3636 717/130 |
| 2014/0325664 A1* | 10/2014 | Nekhoroshev | G06F 8/67 726/26 |
| 2015/0278074 A1* | 10/2015 | Carson | G06F 11/3636 714/38.11 |
| 2015/0378694 A1* | 12/2015 | Lagergren | G06F 8/437 717/143 |
| 2016/0062868 A1* | 3/2016 | Mani | G06F 11/3409 717/130 |
| 2017/0192760 A1* | 7/2017 | Bradbury | G06F 8/443 |

OTHER PUBLICATIONS

Zheng et al., "Dynamic Optimization of Bytecode Instrumentation", ACM, VMIL'13, Oct. 2013, pp. 21-30; <https://dl.acm.org/citation.cfm?id=2542145>.*

Rosà et al., "Speeding up Type-specific Instrumentation for the Analysis of Complex Systems", IEEE, Nov. 2017, pp. 138-141; <http://ieeexplore.ieee.org/document/8292811/>.*

"HUP: A Heap Usage Profiling Tool for Java Programs," Pan et al., Sep. 2001, http://hup.sourceforge.net/manual.pdf.

"Introduction to Adaptive Instrumentation with Symantec Indepth™ for J2EE Application Performance Management," Symantec Corp., May 2006, http://eval.symantec.com/mktginfo/enterprise/white_papers/10574475_Indepth_wp_v3.pdf.

"JDBC Connection Pool Counters," IBM Corp. This is a web page related to the IBM Websphere Application Server product. The web page is dated as being last updated on Nov. 24, 2008. However it is believed that the web page was online before the application was filed. The URL of the web page is: http://publib.boulder.ibm.com/infocenter/wasinfo/v6r0/topic/com.ibm.webspere.express.doc/info/exp/ae/rprf_datacounter2.html.

"Mobile Code Security by Java Bytecode Instrumentation," Chander et al., Aug. 2002, http://www.cis.upenn.edu/~ishin/papers/discex.pdf.

(56) References Cited

OTHER PUBLICATIONS

"Nastel jKool™ Installation and User's Guide," Nastel Technologies, Inc., Jul. 2006, http://1885441442426375655-a-jkoolonline=com-s-sites.googlegroups.com/a/jkoolonline.com/jkool-online/download/jkool_user_guide.pdf?attredirects=0&auth=ANoY7cqf8MWRbT3eGZ2mpDB2qJG-tllnhWW7bv04cYrX77InM9yPuHdZ4VgODwtBimYbn9SBQMDUX5pEstyPu74dk1i1WSAgo9jv3ajU9PuhvFxavYaKVesgMJIR5a2G-K3Z0OTU_OPMsHMB4QcEQnY0WyTNpqWRb0_gk-.

"WLDF Instrumentation Library," BEA Systems, Inc. This is a web page related to the BEA WebLogic Server product. The weg page has a copyright date of 2009. However it is believed that the web page was online before the application was filed. The URL of the web page is: http://edocs.bea.com/wls/docs91/wldf_configuring/appendix_instrum_library.html.

Binder et al., "Advanced Java Bytecode Instrumentation," 2007 ACM, PPPJ 2007, Sep. 5-7, 2007, Lisboa, Portugal, pp. 1-10; <http://dl/acm.org/citation.cfm?id=1294325.1294344&coll=DL&dl=GUIDE&CFID=254190562&CFTOKEN=40561653>.

Mikhail Dmitriev, "Design of JFluid: A Profiling Technology and Tool based on Dynamic Bytecode Instrumentation," Nov. 2003, Sun Mircrosystems, pp. 1-19; <http://labs.oracle.com/techrep/2003/smli_tr-2003-125.pdf>.

Rosu et al., "An instrumentation technique for online analysis of multithreaded programs," 2004 IEEE, IPDPS'04, pp. 1-8; <http://ieeexplore.ieee.org/xpls/abs_all.jsp?arnumber=1303344&tag=1>.

U.S. Appl. No. 11/861,852, entitled "Automatically Adding Bytecode to a Software Application to Determine Database Access Information," filed Sep. 27, 2007.

U.S. Appl. No. 11/863,828, entitled "Automatically Modifying a Native Code Module Accessed from Virtual Machine Bytecode to Determine Execution Information," filed Sep. 27, 2007.

\* cited by examiner

AUTOMATICALLY ADDING BYTECODE TO A SOFTWARE APPLICATION TO DETERMINE NETWORK COMMUNICATION INFORMATION

CROSS-REFERENCE TO RELATED APPLICATIONS

This patent application is a continuation of U.S. patent application Ser. No. 11/862,359, filed Sep. 27, 2007, now allowed as U.S. Pat. No. 8,458,670, which are hereby incorporated by reference herein in their entireties.

BACKGROUND OF THE INVENTION

Field of the Invention

This invention relates generally to computer software. More particularly, the invention relates to a system and method for automatically analyzing virtual machine bytecode of a software application and adding additional bytecode operable to determine information regarding network communication performed by the software application.

Description of the Related Art

Software developers typically create the source code for software applications in a high-level programming language by writing textual program statements that specify the application's functionality. The source code may then be compiled into executable machine code that can be executed by a physical processor. This executable machine code is also referred to as native code because it is formatted so that it executes on a specific type of processor using that processor's instruction set. Thus, native code is typically not portable across different types of computing devices, e.g., devices that use different types of processors.

An alternative method of program execution is to compile the source code into an intermediate form of code called bytecode, which is a binary representation of program instructions suitable for execution on a specific type of virtual machine. The virtual machine itself is implemented in software and is executed by the processor of the physical computing device. A software application that has been compiled into bytecode instructions may be executed on the virtual machine, e.g., by the virtual machine dynamically interpreting the bytecode instructions. Alternatively, another level of compilation may be performed. For example, some virtual machine runtime environments perform just-in-time compilation to compile bytecode into native code during execution of the software application.

The virtual machine provides a layer of abstraction between the compiled bytecode and the underlying hardware platform and operating system. Thus, compiling a software application into bytecode rather than native code may reduce the software application's dependence on specific hardware. For example, the same bytecode may be executed on several different types of computing platforms as long as a virtual machine to execute the bytecode is available on all the respective computing platforms.

Software application code that has been compiled into bytecode may be operable to perform any of various kinds of functions. In particular, many software applications perform network communication, e.g., to communicate with applications or services on remote computer systems.

SUMMARY

Various embodiments of a system and method for automatically adding bytecode to a software application are described. According to one embodiment of the method, program code of a software application may be received, wherein the program code includes bytecode for a virtual machine. The bytecode may be automatically analyzed to detect network communication functionality. The method may operate to automatically add additional bytecode to the bytecode of the software application, where the added bytecode is operable to determine information regarding network communication performed by the software application.

In some embodiments, analyzing the bytecode to detect the network communication functionality may comprise analyzing the bytecode to detect one or more programmatic calls (e.g., function calls or method calls) that perform network communication. The added bytecode may be operable to determine network communication information from the one or more programmatic calls. For example, in some embodiments the added bytecode may be operable to determine a parameter value passed in a programmatic call, wherein the parameter value specifies information regarding network communication performed by the software application.

BRIEF DESCRIPTION OF THE DRAWINGS

A better understanding of the invention can be obtained when the following detailed description is considered in conjunction with the following drawings, in which.

Figure 1:
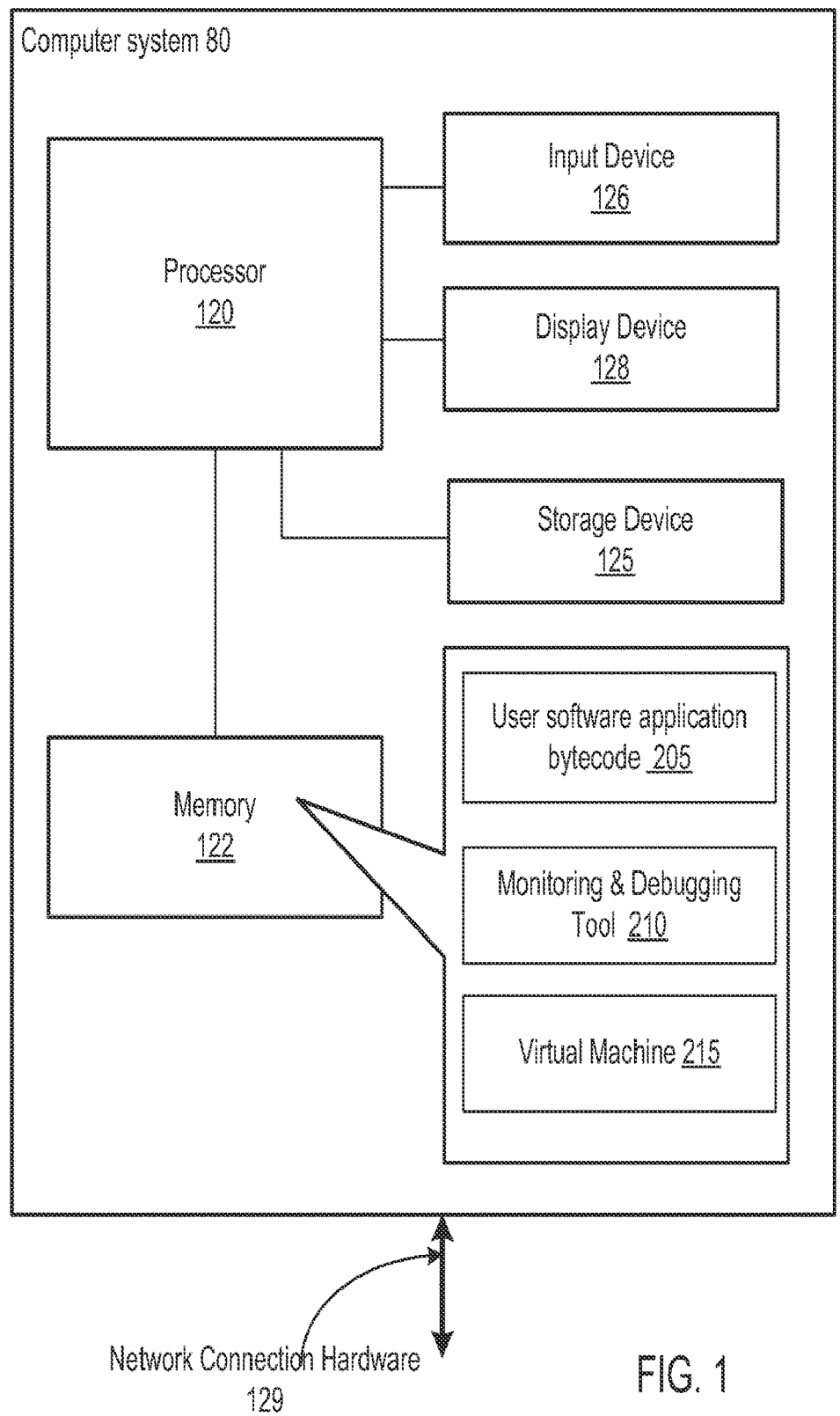
FIG. 1 illustrates one embodiment of a computer system configured to automatically add additional bytecode to a software application, where the additional bytecode is operable to determine information regarding network communication performed by the software application.

While the invention is susceptible to various modifications and alternative forms, specific embodiments thereof are shown by way of example in the drawings and are described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Various embodiments of a system and method for automatically adding additional bytecode to previously existing bytecode of a software application are described herein, where the additional bytecode is operable to determine information regarding network communication performed by the software application.

FIG. 1 illustrates one embodiment of a computer system 80 that is configured to automatically add the additional bytecode to the software application. In various embodiments the computer system 80 may comprise any type of computer system. The computer system 80 may include one or more processors 120 coupled to memory 122. In some embodiments, the memory 122 may include one or more forms of random access memory (RAM) such as dynamic RAM (DRAM) or synchronous DRAM (SDRAM). However, in other embodiments the memory 122 may include any other type of memory instead or in addition.

The memory 122 may be configured to store program instructions and/or data. In particular, the memory 122 may store bytecode 205 for a user software application, e.g., a software application created by a user (e.g., an application developer). In various embodiments the bytecode 205 may comprise any type of bytecode, e.g., may comprise bytecode configured to execute on any of various types of virtual machines. For example, in some embodiments the bytecode 205 may comprise Java bytecode, e.g., bytecode for a Java Virtual Machine (a virtual machine constructed in accordance with a published Java Virtual Machine specification). As another example, in some embodiments the bytecode 205 may comprise bytecode for a Common Language Runtime (CLR) virtual machine, such as Common Interface Language bytecode for a Microsoft.NET software application.

The memory 122 may also store a monitoring and debugging tool 210. The monitoring and debugging tool 210 may execute to automatically add the additional bytecode to the bytecode 205 of the user software application. For example, the monitoring and debugging tool 210 may automatically analyze the bytecode 205 to detect network communication functionality. In response to detecting the network communication functionality, the monitoring and debugging tool 210 may add the additional bytecode to the bytecode 205, where the additional bytecode is operable to determine information regarding the network communication during execution of the user software application. For example, in an embodiment in which the bytecode 205 comprises Java bytecode, the monitoring and debugging tool 210 may utilize Java bytecode instrumentation techniques to automatically add bytecode to determine the network communication information.

As illustrated in FIG. 1, in some embodiments the memory 122 may also store a virtual machine 215, e.g., a virtual machine operable to execute the user software application. The virtual machine 215 may execute or interpret the bytecode 205 as well as the additional bytecode added by the monitoring and debugging tool 210. Thus, the additional bytecode may execute to determine information regarding the network communication performed by the bytecode 205 during execution of the user software application.

In other embodiments, the user software application may be executed directly by the processor 120 instead of executing on a virtual machine 215. For example, in some embodiments the bytecode of the user software application may be compiled into native code for execution by the processor 120. In some embodiments a just-in-time compilation technique may be used to dynamically compile portions of the bytecode of the user software application into native code as needed during execution of the user software application.

Referring again to FIG. 1, it is noted that the processor 120 is representative of any type of processor. For example, in some embodiments, the processor 120 may be compatible with the x86 architecture, while in other embodiments the processor 120 may be compatible with the SPARC™ family of processors. Also, in some embodiments the computer system 80 may include multiple processors 120.

The computer system 80 also includes or is coupled to one or more storage devices 125. In various embodiments the storage devices 125 may include any of various kinds of storage devices operable to store data, such as optical storage devices, disk drives, tape drives, flash memory devices, etc. As one example, the storage devices 125 may be implemented as one or more disk drives configured independently or as a disk storage system. In some embodiments the storage devices 125 may store representations of the user software application bytecode 205, the monitoring and debugging tool 210, and/or the virtual machine 215 before these components are loaded into the memory 122, and/or the storage devices 125 may store portions of these components paged out from the memory 122 using paging techniques.

The computer system 80 may also include one or more input devices 126 for receiving user input from a user of the computer system 80. The input device(s) 126 may include any of various types of input devices, such as keyboards, keypads, microphones, or pointing devices (e.g., a mouse or trackball). The computer system 80 may also include one or more output devices 128 for displaying output to the user. The output device(s) 128 may include any of various types of output devices or display devices, such as LCD screens or monitors, CRT monitors, etc.

The computer system 80 may also include network connection hardware 129 through which the computer system 80 connects to a network. The network connection hardware 129 may include any type of hardware for coupling the computer system 80 to the network, e.g., depending on the type of network. In various embodiments, the computer system 80 may be coupled to any type of network or combination of networks. The user software application may be operable to perform various types of network communication over the network(s) to which the computer system 80 is coupled.

Figure 2:
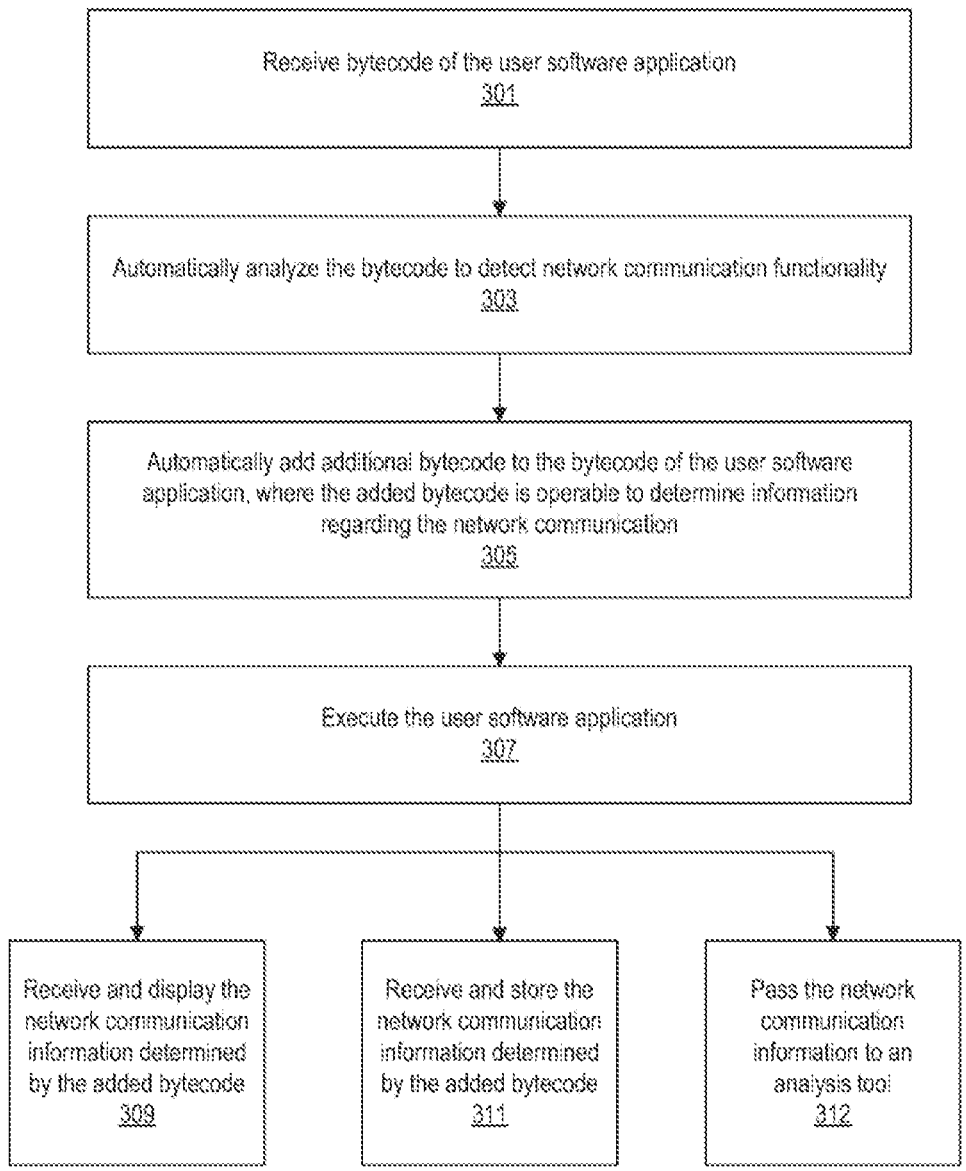
FIG. 2 is a flowchart diagram illustrating one embodiment of a method for adding the additional bytecode to previously existing bytecode of the software application.

FIG. 2 is a flowchart diagram illustrating one embodiment of a method for adding additional bytecode to previously existing bytecode 205 of a user software application. It is noted that the blocks illustrated in FIG. 2 may be performed in various orders, and various blocks may be performed concurrently or repeatedly.

In 301, the bytecode 205 of the user software application may be received by the monitoring and debugging tool 210.

In 303, the monitoring and debugging tool 210 may automatically analyze the bytecode 205 to detect network communication functionality.

In 305, the monitoring and debugging tool 210 may automatically add additional bytecode to the previously existing bytecode 205 of the user software application, where the added bytecode is operable to determine or obtain information regarding the network communication.

In 307, the user software application may be executed. Executing the user software application may include executing the bytecode 205 (or equivalent native code) that performs the network communication, as well is executing the additional bytecode (or equivalent native code) which determines the information regarding the network communication. In some embodiments the user software application may be executed by the virtual machine 215.

In various embodiments, the functionality illustrated in FIG. 2 may be performed in any of various ways. For example, in some embodiments the additional bytecode may be statically added to the previously existing bytecode 205 before the user software application is launched for execution.

In other embodiments, the additional bytecode may be dynamically added to the previously existing bytecode 205 during execution of the user software application. For example, in some embodiments, the user software application may utilize object-oriented classes, where the classes may be dynamically loaded during execution of the user software application. When a class is loaded, the class may be automatically analyzed to detect whether the class or a method in the class performs network communication. If so, then the bytecode that implements the class may be automatically modified, e.g., by adding additional bytecode that determines or obtains information regarding the network communication.

In various embodiments the user software application may perform any type of network communication, and the bytecode that is automatically added to the user software application may be operable to determine any of various kinds of information regarding the network communication.

As one example, automatically analyzing the bytecode to detect the network communication functionality may comprise automatically analyzing the bytecode to detect use of a network connection. In various embodiments the network connection may be any type of network connection. The automatically added bytecode may be operable to determine information regarding the network connection, such as a time when the network connection is opened or closed, an amount of time the network connection stays open, or the number of network connections opened by the user software application.

As another example, automatically analyzing the bytecode to detect the network communication functionality may comprise automatically analyzing the bytecode to detect data transmission functionality. The automatically added bytecode may be operable to determine information regarding the data transmission. In various embodiments the user software application may transmit data using any of various kinds of network communication protocols, and the automatically added bytecode may determine or obtain any kind of information regarding the data transmission. As one example, the automatically added bytecode may determine information indicating what data is transmitted over the network, an amount of data transmitted over the network, a rate at which data is transmitted over the network, etc.

As another example, automatically analyzing the bytecode to detect the network communication functionality may comprise automatically analyzing the bytecode to detect invocation of a remote software object or service. The automatically added bytecode may be operable to determine information regarding the invocation of the remote software object. For example, in some embodiments the user software application may utilize a remote method invocation technique to invoke a method of a software object that executes on a remote computer system. For example, in some embodiments the user software application may include Java bytecode, and the Java bytecode may use Java Remote Method Invocation (Java RMI) to invoke a method of a remote Java object.

As another example, the automatically added bytecode may be operable to determine network status or network failure information. As another example, the added bytecode may be operable to determine statistical information indicating network communication statistics or performance information.

In various embodiments the monitoring and debugging tool 210 may be operable to use any of various techniques in order to detect network communication functionality performed by the user software application. In some embodiments detecting the network communication functionality may comprise detecting one or more programmatic calls (e.g., function calls or method calls) that perform network communication. For example, in some embodiments the user software application may be implemented in a programming language or environment which provides one or more standard libraries or programming interfaces for performing network communication. Thus, network communication functionality may be detected by detecting calls to these standard libraries or programming interfaces.

For example, if the monitoring and debugging tool 210 detects that the user software application includes a method which performs a programmatic call that performs network communication then the monitoring and debugging tool 210 may automatically add additional bytecode to the previously existing bytecode of the method or may automatically modify the previously existing bytecode of the method in order to determine information regarding the programmatic call. In various embodiments, the additional or modified bytecode may determine various types of information regarding the programmatic call, e.g., depending on the particular function performed by the programmatic call. In some embodiments, bytecode for determining one or more parameter values passed to the programmatic call may be automatically added to the method. The one or more parameter values may specify information regarding network communication performed by the user software application.

Referring again to FIG. 2, the method may further comprise receiving and displaying the network communication information determined by the bytecode that was added to the user software application, as indicated in 309. For example, in some embodiments the monitoring and debugging tool 210 may receive the network communication information, e.g., from the virtual machine 215, and may display a graphical user interface on the display device, where the graphical user interface displays the network communication information. The network communication information may be displayed during execution of the user software application and/or after the execution has finished.

The method may also or may alternatively comprise storing the network communication information, as indicated in 311. For example, after the network communication information has been determined it may be written to a log file or stored in a database for future access.

The method may also or may alternatively comprise passing the network communication information to an analysis tool, as indicated in 312. For example, the analysis tool may be operable to analyze the network communication information and generate information enabling a user to monitor the network communication performed by the user software application.

Figure 3:
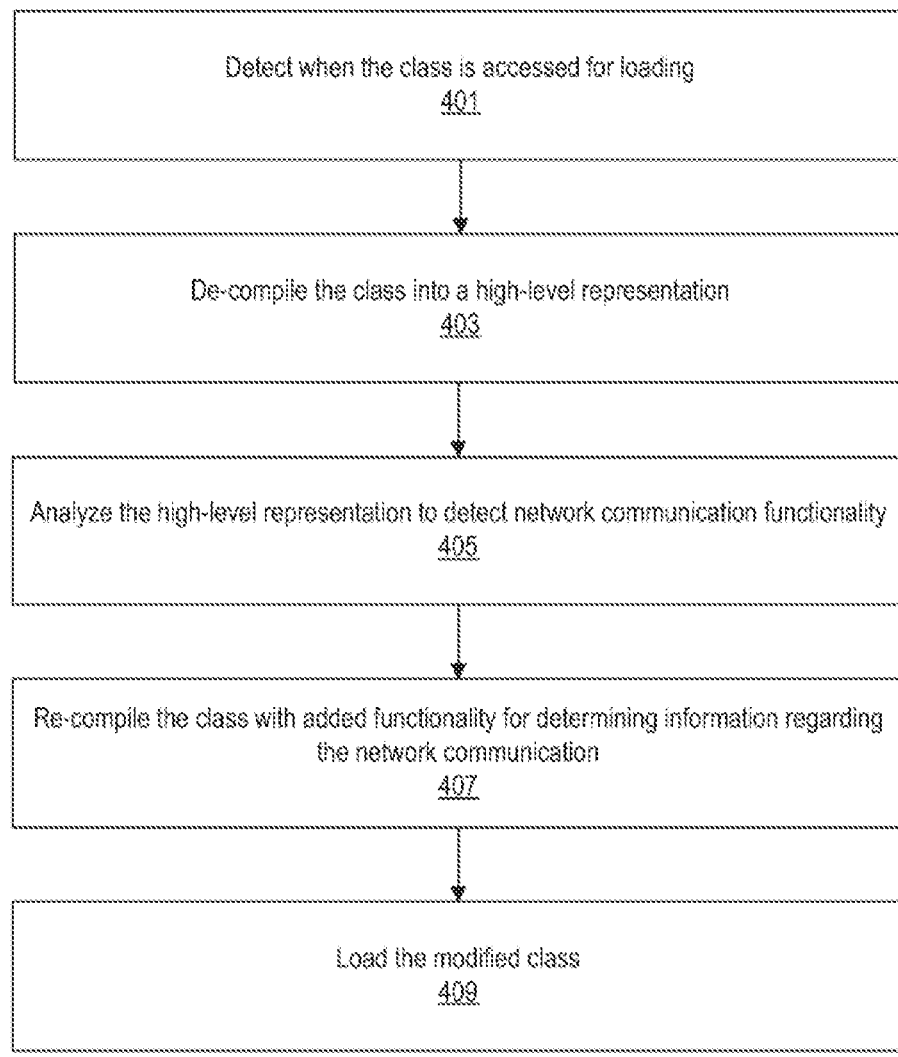
FIG. 3 is a flowchart diagram illustrating one embodiment of a method for dynamically adding the additional bytecode to an object-oriented class used by the user software application.

As described above, in some embodiments the bytecode that determines the network communication information may be dynamically added during execution of the user software application. FIG. 3 is a flowchart diagram illustrating one embodiment of a method for dynamically adding the bytecode to an object-oriented class used by the user software application.

In 401, the method of FIG. 3 may detect when the class is accessed for loading. For example, in some embodiments a class loader module may access the class when the class is needed during execution of the user software application.

In response to detecting the access of the class, the method of FIG. 3 may operate to de-compile the class into a high-level representation. For example, the class may be de-compiled into source code or into tokens or structures representative of source code from which the bytecode of the class was created.

In 405, the high-level representation may be automatically analyzed in order to detect network communication functionality. For example, in some embodiments the high-level representation may be analyzed to detect whether the class includes one or more methods that perform standard library or interface calls to perform network communication.

In 407, the class may be re-compiled with added functionality for determining information regarding the network communication. For example, source code or other information for determining the information may be added to the high-level representation, and the class may then be re-compiled so that it includes the added functionality. Thus, re-compiling the class may produce the additional bytecode that determines or obtains the information regarding the network communication.

In 409, the modified class may be loaded. Thus, when the bytecode of the class executes, the additionally added bytecode that gathers the network communication information may also execute.

It is noted that in various embodiments the monitoring and debugging tool 210 may be architected in various ways and may implement the functionality described above in various ways, e.g., depending on the particular type of bytecode used in the user software application or the type of virtual machine or run-time environment in which the user software application executes. In some embodiments the monitoring and debugging tool 210 may include multiple components or modules that perform the functionality described above. For example, in one embodiment the monitoring and debugging tool 210 may include a dynamic instrumentation component that operates in or with the virtual machine 215. The dynamic instrumentation component may dynamically add bytecode for determining network communication information to various classes or methods of the user software application, similarly as described above. The monitoring and debugging tool 210 may also include a presentation/management component that performs various functions such as receiving the network communication information determined during execution of the user software application, displaying the network communication information in a graphical user interface, logging the network communication information, etc. The presentation/management component may also be operable to display a configuration user interface that allows the user to specify what types of network communication information should be automatically determined or other options affecting the determination of the network communication information and may communicate with the dynamic instrumentation component to pass this information and configure it to add bytecode to the user software application accordingly.

As noted above, in some embodiments, the network communication performed by the user software application may be detected by detecting calls to standard libraries or programming interfaces for performing network communication. For example, the Java programming environment provides standard packages for performing various types of network communication, such as the following: java.net, javax.net, java.nio.channels, java.rmi.* and javax.rmi.* Thus, where the user software application is implemented using the Java programming language, the network communication functionality may be detected by detecting where the user software application calls methods of the classes and interfaces defined by these standard packages.

In an embodiment in which the bytecode of the user software application comprises Java bytecode, the monitoring and debugging tool 210 may utilize Java bytecode instrumentation techniques to automatically add bytecode to determine the network communication information. Java bytecode instrumentation may be used, for example, to extract parameter values passed to methods defined in the standard Java packages listed above. Java bytecode instrumentation may also be used to obtain timing, invocation count, and structural information gathered by the activation of the instrumentation calls themselves.

As a few illustrative examples, Java bytecode instrumentation technology may be used to obtain information such as the following regarding the java.net and javax.net packages:
  Type of network connections
  Number of network connections created, opened, bound, connected, accepting, accepted, or closed
  Addresses listening on, sending to, receiving from, connected to, or bound to
  Addresses and types of proxies
  Multicast groups belonging to and formerly belonging to
  Datagram packets: number created, total size created, max size created
  Local network interface names Java bytecode instrumentation technology may also be used to obtain information regarding the javax.net.ssl package, whose classes and interfaces implement SSL (Secure Sockets Layer) connections. For example, the instrumentation bytecode may determine information such as:
  Number of SSL connections open, closed, or valid
  Time of creation of sessions, time of last access
  Addresses/names of the session peers
  Connection protocols
  Session ID Some of the classes and interfaces of the java.nio.channels package interact with the sockets from java.net to form Java "channels". Java bytecode instrumentation technology may be used to obtain information about quantity of data sent and received using these.

The java.rmi.* and javax.rmi.* packages implement remote method invocations in Java. By instrumenting these classes and interfaces, information such as the following may be determined:
  Number of remote method invocations made, names of them, and servers they were activated on
  Number of live activations
  Number of methods in the local application that are available to be activated by remote applications, which ones have been activated and by which remote servers Throughout the packages mentioned above, exceptions are defined. Java bytecode instrumentation technology may be used to intercept and examine the exceptions for important networking failure information.

It is noted that various embodiments may further include receiving, sending or storing instructions and/or data implemented in accordance with the foregoing description upon a computer-accessible storage medium. Generally speaking, a computer-accessible storage medium may include any storage media accessible by a computer during use to provide instructions and/or data to the computer. For example, a computer-accessible storage medium may include storage media such as magnetic or optical media, e.g., disk (fixed or removable), tape, CD-ROM, DVD-ROM, CD-R, CD-RW, DVD-R, DVD-RW, etc. Storage media may further include volatile or non-volatile memory media such as RAM (e.g. synchronous dynamic RAM (SDRAM), Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. In some embodiments the computer may access the storage media via a communication means such as a network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method comprising:
receiving a program code of a software application, wherein the program code includes a bytecode for a virtual machine; and
dynamically adding additional bytecode to an object-oriented class used by the software application during execution of the software application in which the additional bytecode determines network communication information, including:
automatically analyzing the bytecode to detect a programmatic call that performs network communication, wherein the bytecode is associated with an object-oriented class used by the software application, wherein automatically analyzing the bytecode comprises decompiling the object-oriented class into at least one of source code, tokens, or structures, wherein the at least one of source code, tokens, or structures are representative of source code from which the bytecode associated with the object-oriented class was created; and
automatically modifying the bytecode to include modified bytecode configured to determine a parameter value for the programmatic call, and wherein the parameter value specifies information regarding the network communication, wherein automatically modifying the bytecode comprises adding additional bytecode to the object-oriented class used by the software application and recompiling the class while the software application is being executed.

2. The method of claim 1, wherein automatically analyzing the bytecode comprises automatically analyzing the bytecode to detect use of a network connection, and wherein the modified bytecode comprises modified bytecode to detect use of a network connection.

3. The method of claim 1, wherein information regarding the network communication comprises information indicating what data is transmitted over a network, information indicating an amount of data transmitted over the network, and information indicating a rate at which data is transmitted over the network.

4. The method of claim 1, wherein information regarding the network communication comprises an invocation count for a number of activations of the additional bytecode.

5. The method of claim 1, wherein the modified bytecode comprises modified bytecode determining information regarding network failure.

6. The method of claim 1, further comprising:
displaying a configuration user interface that allows selection of a type of information regarding network communication to be determined; and
receiving a selected type of information from the configuration user interface, wherein the modified bytecode includes bytecode configured to determine the selected type of information regarding network communication.

7. The method of claim 1, further comprising modifying the object-oriented class used by the software application in response to the class being accessed for loading while the software application is being executed.

8. The method of claim 1, wherein analyzing the bytecode comprises analyzing the bytecode to detect a call to a standard library for network communication, and wherein the modified bytecode is configured to determine information regarding the call to a standard library.

9. The method of claim 1, wherein the bytecode of the software application includes bytecode implementing a first method, and wherein modifying the bytecode of the software application comprises automatically modifying at least a portion of the bytecode implementing the first method.

10. The method of claim 1, wherein the bytecode of the software application includes bytecode implementing a first class, and wherein modifying the bytecode of the software application comprises automatically modifying at least a portion of the bytecode implementing the first class.

11. The method of claim 1, wherein the bytecode of the software application comprises bytecode for a Java Virtual Machine (JVM), and wherein the modified bytecode comprises modified JVM bytecode.

12. The method of claim 1, wherein the bytecode of the software application comprises bytecode for a Common Language Runtime (CLR) virtual machine, and wherein the modified bytecode comprises modified bytecode for the CLR virtual machine.

13. The method of claim 1, further comprising:
displaying the information determined by the modified bytecode on a display device; and
logging the information determined by the modified bytecode.

14. The method of claim 1, further comprising passing the information determined by the modified bytecode to an analysis software tool.

15. The method of claim 1, further comprising executing the modified bytecode to determine the information regarding the network communication.

16. The method of claim 15, wherein executing the modified bytecode comprises one or more of:
executing at least a portion of the modified bytecode on a virtual machine;
compiling at least a portion of the modified bytecode into native code; and
executing the native code on one or more processors.

17. A system comprising:
one or more processors; and
memory storing program instructions;
wherein the program instructions are executable by the one or more processors to:
receive program code of a software application, wherein the program code includes a bytecode for a virtual machine; and
dynamically add additional bytecode to an object-oriented class used by the software application during execution of the software application in which the additional bytecode determines network communication information, including:
automatically analyze the bytecode to detect a programmatic call that performs network communication, wherein the bytecode is associated with an object-oriented class used by the software application, wherein automatically analyzing the bytecode comprises decompiling the object-oriented class into at least one of source code, tokens, or structures, wherein the at least one of source code, tokens, or structures are representative of source code from which the bytecode associated with the object-oriented class was created; and
automatically modify the bytecode to determine information regarding the programmatic call, wherein the modified bytecode is configured to determine a parameter value for the programmatic call, and wherein the parameter value specifies information regarding network communication, wherein the program instructions are executable by the one or more processors to modify the bytecode by adding additional bytecode to the object-oriented class used by the software application and recompiling the class while the software application is being executed.

18. A non-transitory computer readable storage medium comprising:

computer readable program instructions executable by a one or more processor to cause the one or more processor to:

receive program code of a software application, wherein the program code includes a bytecode for a virtual machine; and dynamically add additional bytecode to an object-oriented class used by the software application during execution of the software application in which the additional bytecode determines network communication information, including:

automatically analyze the bytecode to detect a programmatic call that performs network communication, wherein the bytecode is associated with an object-oriented class used by the software application, wherein automatically analyzing the bytecode comprises decompiling the object-oriented class into at least one of source code, tokens, or structures, wherein the at least one of source code, tokens, or structures are representative of source code from which the bytecode associated with the object-oriented class was created; and automatically modify the bytecode to determine information regarding the programmatic call, wherein the modified bytecode is configured to determine a parameter value for the programmatic call, and wherein the parameter value specifies information regarding the network communication, wherein the computer system modifies the bytecode by adding additional bytecode to the object-oriented class used by the software application and recompiling the class while the software application is being executed.

* * * * *